(12) United States Patent
Zheng

(10) Patent No.: US 6,282,339 B1
(45) Date of Patent: Aug. 28, 2001

(54) RELIABLE LOW-COST WAVELENGTH DIVISION MULTIPLEXED COUPLER WITH FLEXIBLE AND PRECISE OPTICAL PATH ADJUSTMENT

(75) Inventor: Yu Zheng, Sunnyvale, CA (US)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/309,191

(22) Filed: May 10, 1999

(51) Int. Cl.$^7$ .................................................. G02B 6/32

(52) U.S. Cl. .............................. 385/34; 385/24; 385/31; 385/33; 385/59; 385/60; 385/80; 385/84

(58) Field of Search .................................. 385/59, 60, 24, 385/34, 33, 31, 80, 84

(56) References Cited

U.S. PATENT DOCUMENTS

| | | | |
|---|---|---|---|
| 5,546,486 | * | 8/1996 | Shih ........................................ 385/31 |
| 5,642,448 | * | 6/1997 | Pan ......................................... 385/31 |
| 5,682,452 | * | 10/1997 | Takahashi ............................... 385/85 |
| 6,059,462 | * | 5/2000 | Finak ..................................... 385/73 |
| 6,168,319 | * | 1/2001 | Francis ................................... 385/79 |

\* cited by examiner

Primary Examiner—Cassandra Spyrou
Assistant Examiner—Leo Boutsikaris
(74) Attorney, Agent, or Firm—Bo-In Lin

(57) ABSTRACT

The present invention discloses an improved wavelength division multiplexed (WDM) coupler. The WDM coupler includes a WDM filter attached to a first GRIN lens by applying a first heat-curing epoxy of high viscosity. The high viscosity epoxy is applied on peripheral areas of the first GRIN lens away from the optical path of the WDM coupler. The WDM coupler further includes the first GRIN lens with the WDM filter inserted into a first holding tube. The first holding tube is a two-segment holding tube having a segment near the high viscosity epoxy having a slightly greater inside diameter than a second segment away from the high viscosity epoxy. The first GRIN lens with the WDM filter is fixed into the first holding tube by applying a second heat-curing epoxy. The WDM coupler further includes a second holding tube holding a dual fiber pigtail. The dual fiber pigtail is disposed at a first optimal position from the first GRIN lens to achieve a lowest reflection loss with the first and second holding tubes being in contact with each other. The dual fiber pigtail and the first and second holding tubes are fixed together by applying a third heat-curing epoxy. The WDM coupler further includes a second GRIN lens inserted and fixed into a third holding tube by applying a fourth heat-curing epoxy. The WDM coupler further includes a fourth holding tube holding a standard single fiber pigtail. To achieve a lowest transmission loss, the single fiber pigtail is disposed at a second optimal position from the second GRIN lens while the first GRIN lens is disposed at a third optimal position from the second GRIN lens. With the first, third and fourth holding tubes being in contact with each other, a fifth heat-curing epoxy is applied to fix the third and fourth holding tubes together and a sixth heat-curing epoxy is applied to fix the first and third holding tubes together.

37 Claims, 4 Drawing Sheets

US 6,282,339 B1

RELIABLE LOW-COST WAVELENGTH DIVISION MULTIPLEXED COUPLER WITH FLEXIBLE AND PRECISE OPTICAL PATH ADJUSTMENT

FIELD OF THE INVENTION

This invention relates generally to a method and system for use in optical fiber technology. More particularly, this invention relates to a method and system for manufacturing an improved wavelength division multiplexed coupler.

BACKGROUND OF THE INVENTION

In optical fiber technology, wavelength division multiplexed (WDM) couplers are used to combine or separate optical signals having different wavelengths. As the WDM couplers are being more broadly applied in the telecommunications, data communications and CATV industries, the fiber optic component industry is now confronted with increasing requirements for WDM couplers with higher level of performance and reliability as well as lower cost The performance, reliability and cost of the WDM couplers depend heavily on their design and packaging technologies. Currently, two major kinds of design and packaging technologies are being widely employed in manufacturing the WDM couplers and each kind has its own advantages and disadvantages. In applying a first kind of technology for designing and packaging the WDM couplers, all optical parts are bonded together by applying epoxy bonding. The applications of this first type of WDM couplers show potential reliability risk of epoxy bonding in long-term operation.

FIG. 1A shows the structure of a typical WDM coupler manufactured according to the first kind of design and packaging technology based on epoxy bonding The WDM coupler includes a dual fiber pigtail 25, a GRIN lens 35, a WDM filter 40, a GRIN lens 50, and a single fiber pigtail 60. In a typical manufacturing process, the GRIN lens 35, the WDM filter 40 and the GRIN lens 50 are first fixed together by applying a heat-curing epoxy 45. The relative position of the GRIN lens 35 to the fiber pigtail 25 is adjusted to achieve a lowest transmission loss from the input fiber 15 to the output fiber 20 for optical signals having reflection wavelengths. Then the dual fiber pigtail 25 is fixed to the GRIN lens 35 by applying a heat-curing epoxy 30. Then the relative position of the GRIN lens 50 to the fiber pigtail 60 is adjusted to achieve a lowest transmission loss from the input fiber 15 to the output fiber 65 for optical signals having transmission wavelengths. And then, the single fiber pigtail 60 is fixed to the GRIN lens 50 by applying a heat-curing epoxy 55. The conventional method and system provides the WDM couplers with good performance and reliability suitable for many types of applications. However, the WDM couplers manufactured according to the conventional method and system have a risk of failure when they are applied in high power optical transmission systems. In general, the heat-curing epoxies inevitably spread over all the optical paths in the WDM couplers. More specifically, the heat-curing epoxies 30, 45 and 55 spread over the optical paths between the dual fiber pigtail 25 and the GRIN lens 35, between the GRIN lenses 35, 50 and the WDM filter 40 and between the GRIN lens 50 and the single fiber pigtail 60, respectively. Under long-term operation, the epoxies 30, 45 and 55 when exposed to the transmitted optical signals may gradually become degraded and susceptible to damages and thus lead to unreliable performance after continuously absorbing the optical signal energy. In the typical WDM coupler, the diameter of the optical signal beam is changing from about 10 $\mu$m at the epoxy 30 to about 450 $\mu$m at the epoxy 45 to about 10 $\mu$m at the epoxy 55. Thus, the optical signal power densities at the epoxies 30 and 55 are about 2500 times higher than that at the epoxy 45. Therefore, the risk for high optical power damage is significantly higher at the epoxies 30 and 55 than at the epoxy 45. The difficulties are specially pronounced for transmission of optical signals of high power. Because of the heat absorption problem, many optical system designers and operators now prefer or even demand to have all optical paths of the WDM couplers epoxy-free. Due to the significantly high power density and thus reliability risk, as the first step toward all epoxy-free optical paths, the optical system designers and operators now require not to use any epoxy on the optical paths between the GRIN lenses and the fiber pigtails. However, by applying the conventional WDM method and system, this epoxy-free optical path requirement can not be easily achieved. Thus, further development of reliable fiber optic components with high level of performance and reliability is limited by these difficulties.

In a pending patent application as shown by FIG. 1B, entitled "Low-Cost Wavelength Division Multiplexed Coupler With Flexible and Precise Optical Path Adjustment", filed recently by the present inventor, improvements are achieved for both the long-term high-power operation reliability and cost of the WDM couplers. In the pending application, while epoxies are prevented to spread over or diffused into the optical paths between the GRIN lenses 110', 160' and the fiber pigtails 135', 175' by employing several holding tubes 120', 130', 165' and 180'. Also, low-cost standard single fiber pigtails are used to replace expensive special single fiber pigtails. As a result, while the optical paths between the GRIN lenses and the fiber pigtails are epoxy-free, the costs of the WDM couplers are also reduced. The improved WDM couplers have significantly reduced risk of high optical power damage and lower cost Therefore, the improved WDM couplers can be employed in fiber optic components for broader scope of applications that is much less limited by the reliability and cost problems of the WDM couplers as that encountered in the prior art However, in the pending application, there is still epoxy diffused onto the optical path between the WDM filter 105' and the GRIN lens 110'. Therefore, there is still risk that in the long-term high-power operation, the epoxy 115' may gradually become degraded and susceptible to damages and thus leads to unreliable performance after continuously absorbing the optical signal energy. Thus, further development of the WDM couplers with high level of reliability is limited by these difficulties.

Therefore, a need still exists in the art of design and manufacturing of the WDM couplers to provide improved material compositions, device structure, and manufacturing processes to overcome the difficulties discussed above. Specifically, a technique to provide the WDM couplers with all optical paths being epoxy free is required. Since production costs have been being an important factor prohibiting practical implementation of fiber optic technology, it is also highly desirable that the cost of such a technology would be as low as possible.

SUMMARY OF THE PRESENT INVENTION

It is therefore an object of the present invention to provide an improved design and process for fabricating a low-cost WDM coupler with improved reliability by preventing the epoxies to spread over or diffused into all the optical paths.

By eliminating the epoxies from all the optical paths, the aforementioned difficulties and limitations in the prior art and the pending application can be fully overcome.

Specifically, it is an object of the present invention to provide a design and process to fix all optical parts of the WDM couplers together by applying heat-curing epoxies. Several holding tubes are used between the GRIN lenses and the fiber pigtails to prevent the heat-curing epoxies from spreading over or diffused to the optical paths between the GRIN lenses and the fiber pigtails. Also, a special heat-curing epoxy and a special curing process are used to fix the WDM filter to the GRIN lens to prevent the heat-curing epoxy to enter the optical path between the WDM filter and the GRIN lens. As a result, all the optical paths are epoxy-free according to the new method and system of the WDM couplers of this invention. The WDM couplers produced according to the presently improved design and process have no risk of high optical power damage in the long-term operation. Therefore, the WDM couplers of this invention can be employed in fiber optic components for broadened applications without being limited by the reliability problems of the WDM couplers as those encountered in the prior art and the pending application.

Briefly, in a preferred embodiment, the present invention discloses a WDM coupler. The WDM coupler includes a WDM filter attached to a first GRIN lens by applying a first heat-curing epoxy. The first heat-curing epoxy is a special heat-curing epoxy with high viscosity and resistance to humidity. A special curing process is also desk t o apply the heat-curing epoxy to prevent it from entering the optical path between the WDM filter and the first GRIN lens. The WDM coupler further includes a first holding tube holding the first GRIN lens with the WDM filter. The first GRIN lens with the WDM filter is inserted and fixed in the first holding tube by applying a second heat-curing epoxy. The WDM coupler further includes a second holding tube holding a dual fiber pigtail. The dual fiber pigtail is disposed at a first optimal position from the first GRIN lens to achieve a lowest reflection loss with the first and second holding tubes being in contact with each other. The dual fiber pigtail and the first and second holding tubes are fixed together by applying a third heat-curing epoxy. The WDM coupler further includes a second GRIN lens inserted and fixed into a third holding tube by applying a fourth heat-curing epoxy. The WDM coupler further includes a fourth holding tube holding a standard single fiber pigtail. To achieve a lowest transmission loss, the single fiber pigtail is disposed at a second optimal position from the second GRIN lens while the first GRIN lens is disposed at a third optimal position from the second GRIN lens. With the first, third and fourth holding tubes being in contact with each other, a fifth heat-curing epoxy is applied to fix the third and fourth holding tubes together an a sixth heat-curing epoxy is applied to fix the first and third holding tubes together.

The present invention further discloses a method for fabricating a WDM coupler. The method includes the steps of: a) attaching a WDM filter to a first GRIN lens by applying a first heat-curing epoxy of high viscosity away from an optical path of the WDM coupler; b) inserting the first GRIN lens with the WDM filter into a first holding tube having a length slightly longer than the combined length of the first GRIN lens and the WDM filter and having an slightly greater inside diameter near the WDM filter and then fixing the first GRIN lens with the WDM filter in the first holding tube by applying a second heat-curing epoxy; c) inserting a dual fiber pigtail into a second holding tube then adjusting a relative position between the dual fiber pigtail and the first GRIN lens on an alignment stage to achieve a lowest reflection loss; d) sliding the second holding tube along the dual fiber pigtail without moving the dual fiber pigtail until the first and second holding tubes are in contact then fixing the first and second holding tubes and the dual fiber pigtail together by applying a third heat-curing epoxy; e) inserting and fixing a second GRIN lens into a third holding tube having a length slightly longer than that of the second GRIN lens by applying a fourth heat-curing epoxy; f) inserting a single fiber pigtail into a fourth holding tube; g) mounting the first holding tube with the first GRIN lens and the WDM filter, the third holding tube with the second GRIN lens and the fourth holding tube with the single fiber pigtail on an alignment stage then adjusting relative positions of the first GRIN lens to the second GRIN lens and the single fiber pigtail to the second GRIN lens until a lowest transmission loss is achieved with the first, third and fourth holding tubes being in contact with each other; and h) fixing the third and fourth holding tubes together by applying a fifth heat-curing epoxy and then fixing the first and third holding tubes together by applying a sixth heat-curing epoxy.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

The present invention discloses a WDM coupler that includes major parts of the fiber pigtails, the GRIN lenses and the WDM filter. These parts are fixed together by applying heat-curing epoxies while the epoxies employed for bonding are prevented from spreading over all the optical paths.

Figure 1A:
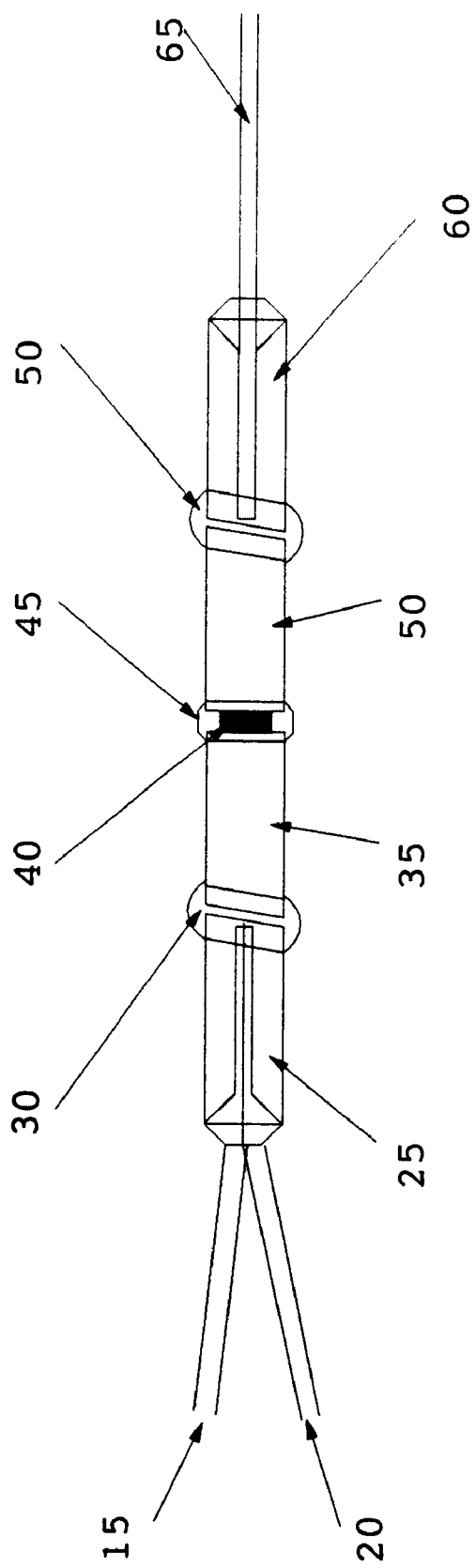
FIG. 1A is a cross sectional view of the WDM coupler made according to the conventional design and packaging technology.
Figure 1B:
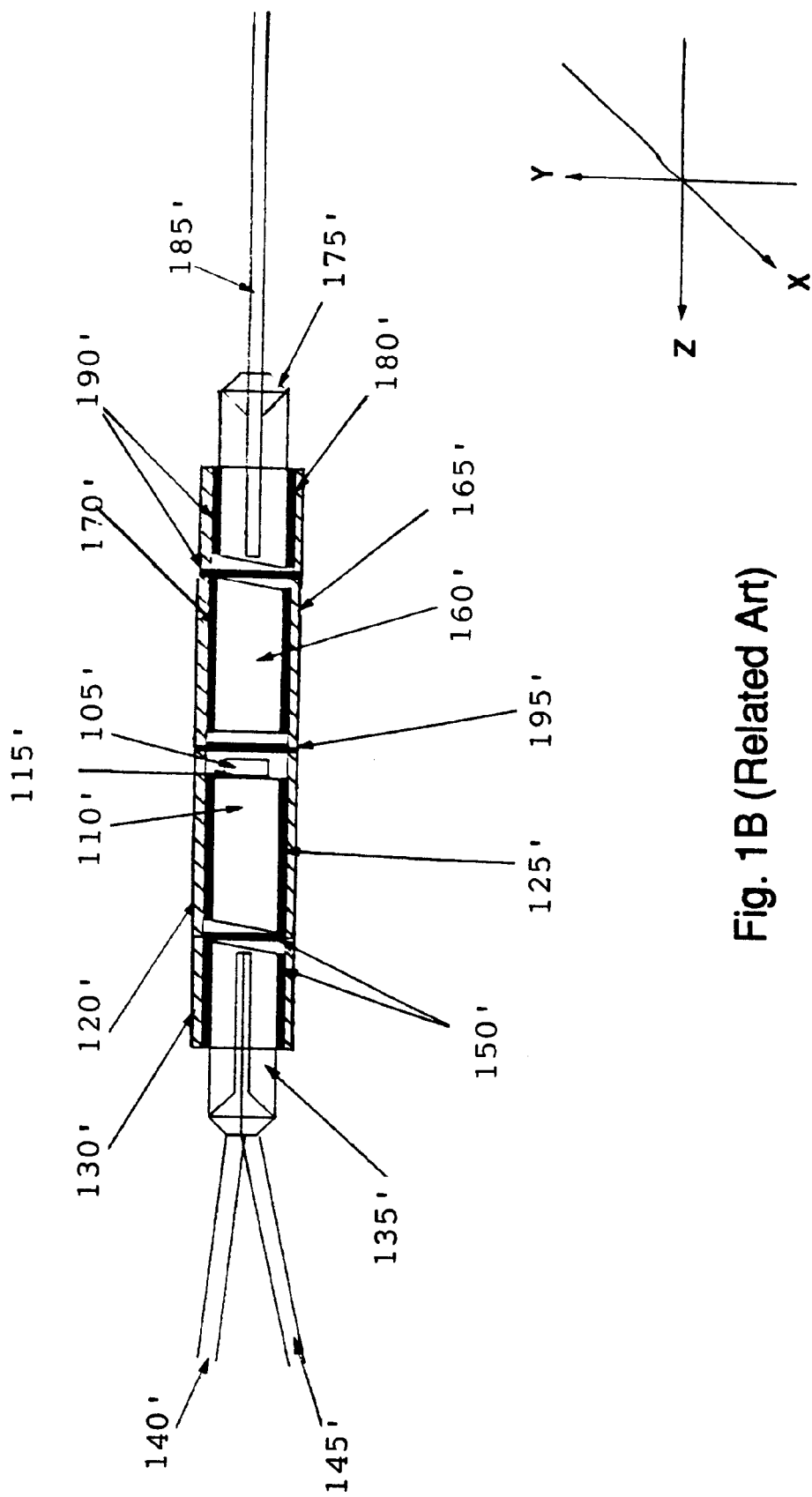
FIG. 1B is a cross sectional view of the WDM coupler made according to the previously improved design and packaging technology.
Figure 2A:
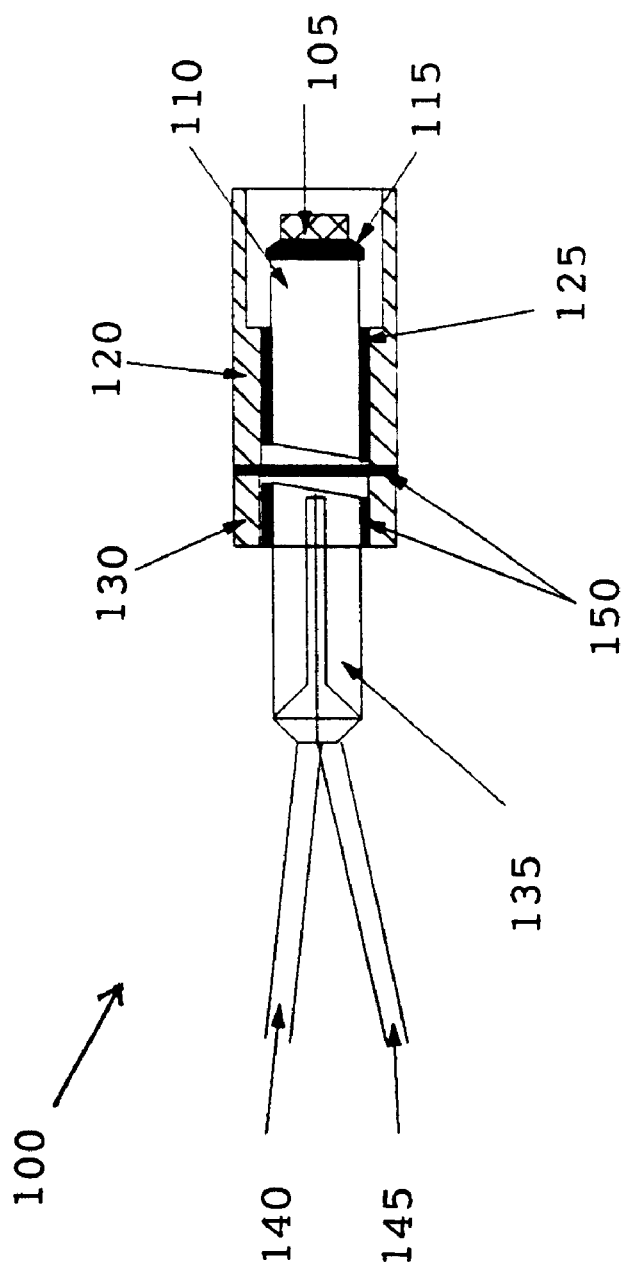
FIGS. 2A to 2B are cross sectional view of the WDM coupler for illustrating the fabrication steps for making a WDM coupler of this invention.
Figure 2B:
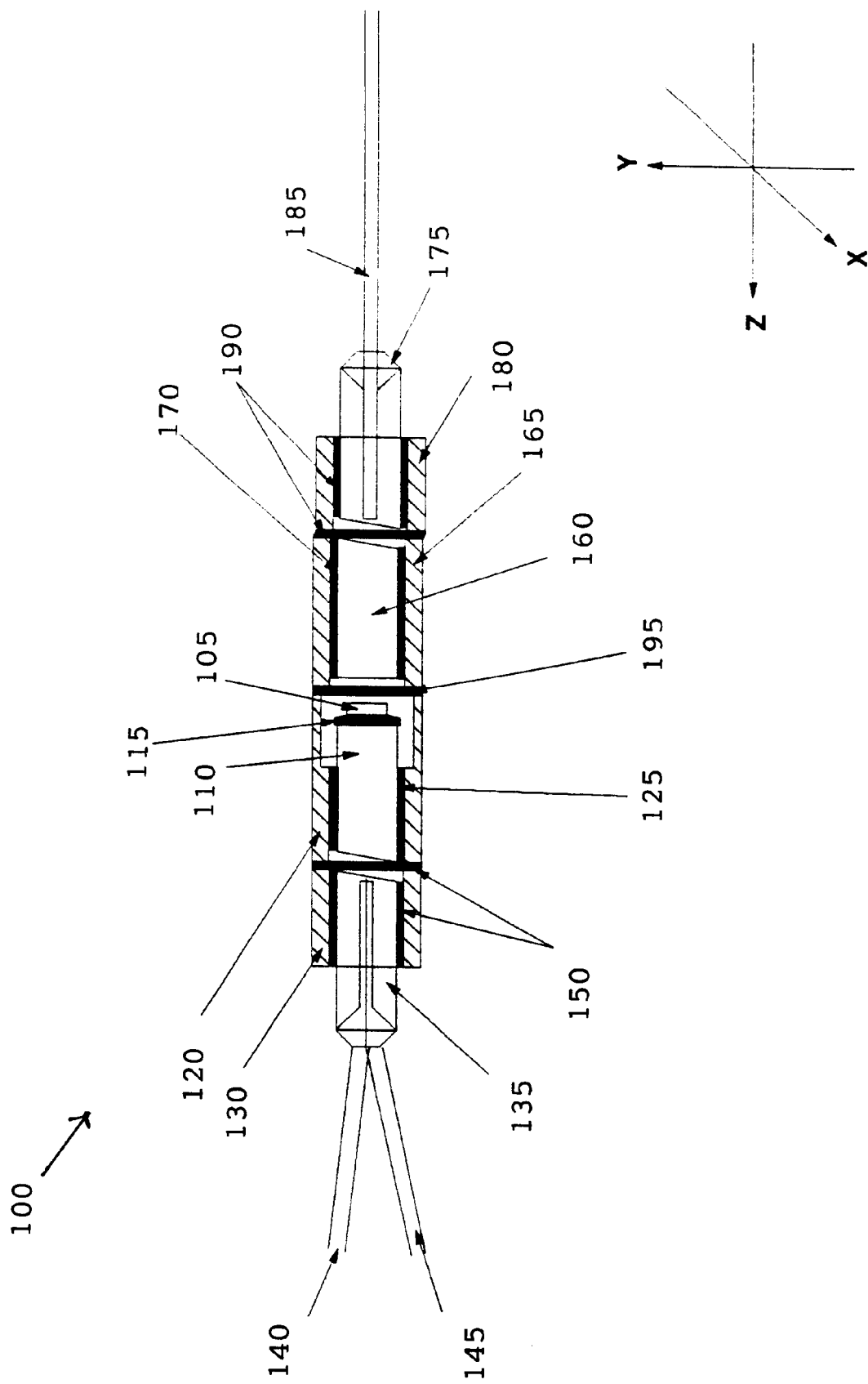

Please refer to FIGS. 2A to 2B for discussion of the materials and the fabrication processes employed to provide an improved WDM coupler 100 of this invention. In FIG. 2A, a WDM filter 105 is attached to a first GRIN lens 110 by applying a first heat-curing epoxy 115. In the pending application as shown by FIG. 1B, the 353ND heat-curing epoxy from Epoxy Technology Inc. located in Billerica, Mass. was employed as the first heat-curing epoxy 115 to fix the WDM filter to the GRIN lens. Because of its low viscosity, the 353ND epoxy will always diffuse to the optical path between the WDM filter and the first GRIN lens when it is applied. To prevent the epoxy from entering the optical path between the WDM filter and the GRIN lens, an EP42HT heat-curing epoxy from Master Bond Inc. located in Hackensack, New Jersey is employed as the first heat-curing epoxy 115 in the present invention. As compared to the 353ND epoxy, the EP42HT epoxy has high viscosity and thus does not move around easily. The EP42HT epoxy also has good resistance to high temperature and humidity. For the purpose of completely preventing the EP42HT epoxy from entering the optical path between the WDM filter and the GRIN lens in any situation, a special bonding and curing process has been developed in the present invention. The EP42HT epoxy is first prepared and then gelled at room temperature for about two hours. Then the EP42HT epoxy is applied to the boundary areas between the WDM filter and the GRIN lens. Then the EP42HT epoxy is further gelled at room temperature for another one hour. Finally, the EP42HT epoxy is cured at 110C. for another one hour. According to this manufacturing process, the EP42HT epoxy will enter only the very outside interface areas between the WDM filter and the GRIN lens to provide bonding between the WDM filter and the GRIN lens but not the optical path between the WDM filter and the GRIN lens. To obtain strong bonding between the WDM filter and the GRIN lens, a certain amount of the EP42HT epoxy is applied around the interface area between the WDM filter and the GRIN lens. Usually, the diameter of the EP42HT epoxy bonding will be slightly larger than that of the GRIN lens.

After the WDM filter 105 is attached to the first GRIN lens 110, the first GRIN lens 110 attached to the WDM filter 105 is inserted into a first holding tube 120. The first holding tube 120 has a length slightly longer than the combined length of the WDM filter 105 and the first GRIN lens 110. The first GRIN lens 110 and the WDM filter 105 is fixed to the first holding tube 120 by applying a second heat curing epoxy 125. Since the diameter of the epoxy bonding 115 is slightly larger than that of the first GRIN lens 110, the holding tube 120 has larger inside diameter at the side of the epoxy bonding 115 than at the other side. After a second holding tube 130 is mounted onto a dual fiber pigtail 135, the filter 105/lens 110/tube 120 sub-assembly and the fiber pigtail 135 with the holding tube 130 are mounted on an alignment stage (not shown). Then a distance and orientation of the fiber pigtail 135 relative to the GRIN lens 110 is adjusted to achieve a lowest reflection loss from the input fiber 140 to the output fiber 145. After the fiber pigtail 135 is placed at its optimal position relative to the GRIN lens 110, the position of the holding tube 130 is adjusted so that its end surface is in contact with that of the holding tube 120. Then a third heat-curing epoxy 150 is applied to fix the fiber pigtail 135 and the two holding tubes 120 and 130 together and thus an assembly of a dual fiber collimator 155 is completed. After the epoxy 150 is applied, it will spread over all contact areas between the holding tube 130 and the fiber pigtail 135 and between the holding tubes 120 and 130. However, it will not contaminate the optical path between the GRIN lens 110 and the fiber pigtail 135 because of surface tension.

Referring now to FIG. 2B, a second GRIN lens 160 is inserted and fixed into a third holding tube 165 having a length slightly longer than that of the GRIN lens 160 by applying a fourth heat-curing epoxy 170. Then a single fiber pigtail 175 is inserted into a fourth holding tube 180. The single fiber pigtail 175 is a low-cost standard single fiber pigtail, like that used in the pending patent application. Then the first holding tube 120 with the first GRIN lens 110 and the WDM filter 105, the third holding tube 165 with the second GRIN lens 160 and the fourth holding tube 180 with the single fiber pigtail 175 are mounted on an alignment stage (not shown). A pigtail position-adjustment is made on the alignment stage to achieve optimal positions of the first GRIN lens 110 to the second GRIN lens 160 and the single fiber pigtail 175 to the second GRIN lens 160 with a lowest transmission loss.

In addition to the improved attachment configuration between the WDM filter and the first GRIN lens, with this configuration of FIG. 2B, the -process of the position adjustment of the single fiber pigtail 175 is provided with greater degree of flexibility. As described in the pending application as shown in FIG. 1B, the fourth holding tube 180' holding the single fiber pigtail 175' can be moved in all three dimensions without limitations. The outgoing orientation of the single fiber collimator is adjusted by moving the fourth holding tube 180 holding the single fiber pigtail 175 in all X-Y-Z directions until optimal focus and orientation angle alignment are achieved. For the purpose of outgoing-orientation alignment, the fourth holding tube 180 is adjusted to be slightly lower, e.g., by a small distance of less than 0.1 mm, than the third holding tube 165. Since the thickness of the holding tube 180 is about 0.4 to 0.8 mm, the small distance adjustment of the fourth holding tube 180 relative to the third holding tube 160 would not affect the bonding strength by the heat curing epoxy 190. The process of securely bonding the fourth holding tube 180 to the third holding tube 165 will be further discussed below.

On the alignment stage, the first holding tube 120 is in physical contact with the third holding tube 165 and the third holding tube 165 is in physical contact with the fourth holding tubes 180. A fifth heat-curing epoxy 190 is applied to fix the fiber pigtail 175 and the third and fourth holding tubes 165 and 180 together. Then, a sixth heat-curing epoxy 195 is applied to fix the first and third holding tubes 120 and 165 together. The epoxy 190 will permeate the whole contact areas between the single fiber pigtail 175 and the fourth holding tube 180 and between the third and fourth tubes 160 and 180. Also, the epoxy 195 will permeate the whole contact areas between the first and third holding tubes 120 and 165. By assembling a WDM coupler according to the above method and system, two GRIN lenses of 0.23 pitch are implemented as the first GRIN lens 110 and the second GRIN lens 160. The use of 0.23-pitch GRIN lenses is to provide an optimal gap of about 0.2 mm between the GRIN lenses and the fiber pigtails, which will prevent heat-curing epoxies from entering the optical paths between the GRIN lenses and the fiber pigtails due to surface tension.

In the present invention, the lengths of the holding tubes 120, 130, 165 and 180 are chosen as about 5.7 mm, 3 mm, 4.7 mm and 3 mm, respectively. While the left-side inside diameter of the holding tube 120 is chosen to match with that of the GRIN lens 110. At the left side, the inside diameter is chosen to be about 1.8 mm. The right-side inside diameter of the holding tube 120 is chosen to be slightly larger than that of the epoxy bonding 115 such as 2.6 mm. The inside diameters of the holding tubes 130, 165 and 180 are chosen to match with those of the GRIN lens 160 and the fiber pigtails 135, 175, i.e., 1.8 mm. The outside diameters of the holding tubes 120, 130, 165 and 180 are chosen as about 3.6 mm. In a preferred embodiment, the first, second, third and fourth holding tubes are preferably glass tubes which have about the same thermal expansion coefficients as the GRIN lenses and the fiber pigtails. In a preferred embodiment, the second, third, fourth, fifth and sixth heat-curing epoxies are preferably a 353ND heat-curing epoxy from Epoxy Technology Inc. located in Billerica, Massachusetts because it has very good glass-to-glass bonding strength, thermal stability and humidity reliability.

According to FIGS. 2A to 2B and the above description, this present invention discloses a WDM coupler. The WDM coupler includes a dual fiber collimator that includes a WDM filter attached to a GRIN lens held in a first holding tube and a dual fiber pigtail held in a second holding tube. The WDM filter is attached to the first GRIN lens by a high viscosity epoxy disposed away from an optical path of the WDM coupler. The WDM coupler further includes a single fiber collimator that includes a GRIN lens held in a third holding tube and a single fiber pigtail held in a fourth holding tube. The first holding tube and second holding tube are in contact and bonded with an epoxy and the fourth holding tube disposed at a slightly different vertical position from the third holding tube to achieve an aligned outgoing orientation between the single fiber pigtail and the dual fiber collimator. In a preferred embodiment, the first holding has a greater inside diameter near the high viscosity epoxy than an inside diameter near the first GRIN lens. In a preferred embodiment, the fourth holding tube is disposed slightly below the third holding tube. In another preferred embodiment, the first, second, third and fourth holding tubes are glass holding-tubes. In another preferred embodiment, the epoxy is a heat-curing epoxy.

In summary, this invention discloses an optical device includes a plurality of optical parts for processing an optical signal transmission therein. The device includes a plurality of gaps each having an adjusted distance between the plurality of optical parts. The device further includes two holding tubes holding two of the plurality of optical parts and the holding tubes are in contact with each other in at least one of the gaps. At least one of the optical components is attached to a second optical component with a high viscosity epoxy disposed away from an optical path of the optical device. In a preferred embodiment, at least one of the holding tubes has an inside diameter slightly greater near the high viscosity epoxy than an inside diameter of a remaining portion of the holding tube. In another preferred embodiment, at least one of the holding tubes is arranged to having a slightly different vertical position than other hold tubes for outgoing orientation alignment The device further includes an epoxy applied over contact area between two of the holding tubes over one of the gaps for securely bonding the holding tubes holding the plurality of optical parts. In a preferred embodiment, the holding tubes over at least one of the gaps between the optical parts are glass holding-tubes. In a preferred embodiment, the epoxy applied over the contact area between two of the holding tubes over one of the gaps for securely bonding the holding tubes holding the plurality of optical parts is a heat-curing epoxy.

According to FIGS. 2A to 2B and the above descriptions, this invention discloses a method for fabricating a WDM coupler. The method includes the steps of: a) preparing a first heat-curing epoxy of high viscosity followed by gelling at room temperature for about two hours; b) attaching a WDM filter to a first GRIN lens by applying the first heat-curing epoxy of high viscosity around the outside boundary areas between the WDM filter and the first GRIN lens followed by further gelling at room temperature for another one hour and then curing at 110C. for one hour; c) inserting and fixing the first GRIN lens with the WDM filter into a first holding tube having a length slightly longer than the combined length of the first GRIN lens and the WDM filter by applying a second heat-curing epoxy; d) inserting a dual fiber pigtail into a second holding tube then adjusting a relative position between the dual fiber pigtail and the first GRIN lens on an alignment stage to achieve a lowest reflection loss; e) sliding the second holding tube along the dual fiber pigtail without moving the dual fiber pigtail until the first and second holding tubes are in contact then fixing the first and second holding tubes and the dual fiber pigtail together by applying a third heat-curing epoxy; f) inserting and fixing a second GRIN lens into a third holding tube having a length slight longer than that of the second GRIN lens by applying a fourth heat-curing epoxy; g) inserting a single fiber pigtail into a fourth holding tube; h) mounting the first holding tube with the first GRIN lens attached to the WDM filter, the third holding tube with the second GRIN lens and the fourth holding tube holding the single fiber pigtail on an alignment stage; i) adjusting relative positions of the first GRIN lens to the second GRIN lens, and the single fiber pigtail to the second GRIN lens to achieve a lowest transmission loss with the first, third and fourth holding tubes being in contact with each other; j) applying a fifth heat-curing epoxy for securely bonding the single fiber pigtail to the fourth holding tube and bonding the fourth holding tube to the third holding tube; and k) applying a sixth heat-curing epoxy for securely bonding the third holding tube holding the second GRIN lens to the first holding tube holding the first GRIN lens with end surfaces in close contact.

Therefore, the present invention discloses a new design and process for fabricating a WDM coupler with improved reliability by preventing the epoxies from entering all the optical paths. The difficulties and limitations in the prior art and the pending application are fully overcome. Specifically, this invention discloses a fabrication process to fix the WDM couplers by applying heat-curing epoxies to produce the WDM couplers with better reliability in the long-term high-power operation. Holding tubes are used between the fiber pigtails and the GRIN lenses to prevent the heat-curing epoxies from spreading over the optical paths between the GRIN lenses and the fiber pigtails. Also, a special heat-curing epoxy of high viscosity and a special curing process are employed to fix the WDM filter to the GRIN lens to prevent the epoxy from entering the optical path between the WDM filter and the GRIN lens. Therefore, the improved WDM couplers can be employed in fiber optic components for broaden applications without being limited by the reliability problems of the WDM couplers as those encountered in the prior art and the pending application.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method for fabricating a WDM coupler comprising steps of a) attaching a WDM filter to a first GRIN lens by applying a first heat-curing epoxy of high viscosity away from an optical path of said WDM coupler;

b) inserting and fixing said first GRIN lens attached to said WDM filter into a first holding tube by applying a second heat-curing epoxy;

c) inserting a dual fiber pigtail into a second holding tube then adjusting a relative position between said dual fiber pigtail and said first GRIN lens on an alignment stage to achieve a lowest reflection loss;

d) sliding said second holding tube along said dual fiber pigtail without moving said dual fiber pigtail until said first and second holding tubes are in contact then fixing said first and second holding tubes and said dual fiber pigtail together by applying a third heat curing epoxy;

e) inserting and fixing a second GRIN lens into a third holding tube by applying a fourth heat-curing epoxy;

f) inserting a single fiber pigtail into a fourth holding tube;

g) mounting said first holding tube with said first GRIN lens attached to said WDM filter, the third holding tube with said second GRIN lens and said fourth holding tube holding said single fiber pigtail on an alignment stage;

h) adjusting relative positions of said first GRIN lens to said second GRIN lens and said single fiber pigtail to said second GRIN lens to achieve a lowest transmission loss with said first, third and fourth holding tubes being in contact with each other;

i) applying a fifth heat-curing epoxy for securely bonding said single fiber pigtail to said fourth holding tube and bonding said fourth holding tube to said third holding tube; and j) applying a sixth heat-curing epoxy for securely bonding said third holding tube holding said second GRIN lens to said first holding tube holding said first GRIN lens with end surfaces in close contact.

2. A method nfor fabricating a WDM coupler comprising steps of a) attaching a WDM filter to a first GRIN lens by applying a EP42HT epoxy as a first heat-curing high-viscosity epoxy away from an optical path of said WDM coupler;

b) inserting and fixing said first GRIN lens attached to said WDM filter into a first holding tube by applying a second heat-curing epoxy;

c) inserting a dual fiber pigtail into a second holding tube then adjusting a relative position between said dual fiber pigtail and said first GRIN lens on an alignment stage to achieve a lowest reflection loss;

d) sliding said second holding tube along said dual fiber pigtail without moving said dual fiber pigtail until said first and second holding tubes are in contact then fixing said first and second holding tubes and said dual fiber pigtail together by applying a third heat curing epoxy;

e) inserting and fixing a second GRIN lens into a third holding tube by applying a fourth heat-curing epoxy;

f) inserting a single fiber pigtail into a fourth holding tube;

g) mounting said first holding tube with said first GRIN lens attached to said WDM filter, the third holding tube with said second GRIN lens and said fourth holding tube holding said single fiber pigtail on an alignment stage;

h) adjusting relative positions of said first GRIN lens to said second GRIN lens and said single fiber pigtail to said second GRIN lens to achieve a lowest transmission loss with said first, third and fourth holding tubes being in contact with each other;

i) applying a fifth heat-curing epoxy for securely bonding said single fiber pigtail to said fourth holding tube and bonding said fourth holding tube to said third holding tube; and j) applying a sixth heat-curing epoxy for securely bonding said third holding tube holding said second GRIN lens to said first holding tube holding said first GRIN lens with end surfaces in close contact.

3. The method of claim 2 wherein:

said steps of applying said second, third, fourth, fifth and sixth heat-curing epoxies are steps of applying a 353ND epoxy.

4. The method of claim 2 wherein:

said steps of employing said first, second, third, and fourth holding tubes are steps of employing glass tubes.

5. The method of claim 2 wherein:

said step a) of attaching said WDM filter to said first GRIN lens is a step of attaching said WDM filter to said first GRIN lens of 0.23 pitch.

6. The method of claim 2 wherein:

said step b) of inserting and fixing said first GRIN lens attached to said WDM filter into said first holding tube is a step of inserting and fixing said first GRIN lens attached to said WDM filter into said first holding tube having a length of about 5.5 to 6.5 mm, an inside diameter of about 2.6 mm at a portion near said first epoxy of high viscosity and inside diameter of about 1.8 mm at remaining portion near said first GRIN lens and an outside diameter of about 3.6 mm.

7. The method of claim 2 wherein:

said step c) of inserting said dual fiber pigtail into said second holding tube is a step of inserting said dual fiber pigtail into said second holding tube having a length of about 2.5 to 3.0 mm, an inside diameter of about 1.8 mm and an outside diameter of about 3.6 mm.

8. The method of claim 2 wherein:

said step e) of inserting said second GRIN lens into said third holding tube is a step of inserting said second GRIN lens into said third holding tube having a length of about 4.5 to 5.5 mm, an inside diameter of about 1.8 mm and an outside diameter of about 3.6 mm.

9. The method of claim 2 wherein:

said step e) of inserting said second GRIN lens into said third holding tube is a step of inserting said second GRIN lens of 0.23 pitch into said third holding tube.

10. The method of claim 2 wherein:

said step f) of inserting said single fiber pigtail into said fourth holding tube is a step of inserting said single fiber pigtail into said fourth holding tube having a length of about 2.5 to 3.0 mm, an inside diameter of about 1.8 mm and an outside diameter of about 3.6 mm.

11. The method of claim 2 wherein:

said step h) of adjusting relative positions of said first GRIN lens to said second GRIN lens, and said single fiber pigtail to said second GRIN lens to achieve a lowest transmission loss is a step of including a three-dimensional position adjustment of said single fiber pigtail for adjustment of both focusing and outgoing orientation.

12. A method for fabricating an optical device wherein said optical device includes a plurality of optical parts for processing an optical signal transmission therein, comprising steps of:

a) applying a first high viscosity epoxy on areas away from an optical path of said optical device for bonding at least two said optical parts then inserting said plurality of optical parts into holding tubes and arranging and adjusting said plurality of optical parts having an optimal position from each other for achieving optimal focus and outgoing orientation alignment;

b) applying a second epoxy for bonding said optical parts in said holding tubes;

c) sliding said holding tubes toward a gap between each of said optical parts and having edges contacting each other; and d) applying an epoxy for bonding said optical parts to said holding tubes and bonding said holding tubes together.

13. A method for fabricating an optical device wherein said optical device includes a plurality of optical parts for processing an optical signal transmission therein, comprising steps of:

a) applying an EP42HT epoxy as a first high viscosity epoxy on areas away from an optical path of said optical device for bonding at least two said optical parts then inserting said plurality of optical parts into holding tubes and arranging and adjusting said plurality of optical parts having an optimal position from each other for achieving optimal focus and outgoing orientation alignment;

b) applying a second epoxy for bonding said optical parts in said holding tubes;

c) sliding said holding tubes toward a gap between each of said optical parts and having edges contacting each other; and d) applying an epoxy for bonding said optical parts to said holding tubes and bonding said holding tubes together.

14. The method of claim 13 wherein:

said step a) of inserting said plurality of optical parts into holding tubes includes a step of inserting said optical parts bonded by said high viscosity epoxy into a two-segment holding tube having a segment near high viscosity epoxy having a slightly greater inside diameter than a second segment away from said high viscosity epoxy.

15. The method of claim 13 wherein:

said steps a) of adjusting said plurality of optical parts held in said holding tubes having an optimal position from each other for achieving optimal focus and outgoing orientation alignment is a step of performing a three-dimensional position adjustment.

16. The method of claim 13 wherein:

said steps a) of inserting said optical parts into said holding tubes is a step of inserting said optical parts into glass holding tubes.

17. The method of claim 13 wherein:

said steps a) of inserting said optical parts into said holding tubes is a step of inserting said optical parts into said holding tubes having inner diameters slightly greater than an outer diameter of said optical parts for slighting and moving along said optical parts.

18. The method of claim 13 wherein:

said step b) of applying a second epoxy for bonding said optical parts in said holding tubes, and said step d) of applying an epoxy for bonding said optical parts to said holding tubes and bonding said holding tubes together are steps of applying a heat-curing epoxy.

19. The method of claim 18 wherein:

said step of applying said heat-curing epoxy is a step of applying a 353ND heat-curing epoxy.

20. The method of claim 13 wherein:

said steps a) of inserting said optical parts into said holding tubes is a step of inserting said optical parts into said holding tubes having lengths ranging from 2.5 to 9 mm, having inner diameters of about 1.8 to 2.6 mm and outer diameters of about 3.6 nm.

21. The method of claim 13 wherein:

said steps a) of inserting said optical parts into said holding tubes is a step of inserting at least a dual fiber pigtail and a single fiber pigtail and arranging said holding tubes to make said single and dual fiber pigtails having aligned outgoing orientation and said holding tubes in parallel to a single axis with end surfaces in physical contact for secure bonding with said epoxy.

22. A WDM coupler comprising:

a first GRIN lens attached to a WDM filter via a first epoxy of high viscosity between said first GRIN lens and said WDM filter with said first epoxy of high viscosity disposed on outside peripheral areas of said first GRIN lens away from an optical path of said WDM coupler;

a first holding tube holding and securely bonding to said first GRIN lens with a second epoxy;

a dual optical fiber pigtail disposed at a first optimal gap from said first GRIN lens to achieve a lowest transmission loss;

a second holding tube holding and securely bonding to said dual optical fiber pigtail with a third epoxy and said first and second holding tubes being further securely bonding to each other with a fourth epoxy for maintaining said optimal gap between said first GRIN lens and said dual fiber pigtail;

a third holding tube holding and bonding to a second GRIN lens with a fifth epoxy;

a fourth holding tube holding a single fiber pigtail disposed at a second optimal distance from said second GRIN lens said fourth tube securely bonding to said single fiber pigtail and to said third holding tube with a sixth epoxy for maintaining said second optimal distance; and said first holding tube holding said first GRIN lens in physical contact and securely bonding to said third holding tube holding said second GRIN lens with a seventh epoxy wherein said WDM filter is aligned with said second GRIN lens and said single and dual fiber pigtails having aligned outgoing orientation.

23. A WDM coupler comprising:

a first GRIN lens attached to a WDM filter via a EP42HT epoxy as a first epoxy between said first GRIN lens and said WDM filter with said first epoxy of high viscosity disposed on outside peripheral areas of said first GRIN lens away from an optical path of said WDM coupler;

a first holding tube holding and securely bonding to said first GRIN lens with a second epoxy;

a dual optical fiber pigtail disposed at a first optimal gap from said first GRIN lens to achieve a lowest transmission loss;

a second holding tube holding and securely bonding to said dual optical fiber pigtail with a third epoxy and said first and second holding tubes being further securely bonding to each other with a fourth epoxy for maintaining said optimal gap between said first GRIN lens and said dual fiber pigtail;

a third holding tube holding and bonding to a second GRIN lens with a fifth epoxy;

a fourth holding tube holding a single fiber pigtail disposed at a second optimal distance from said second GRIN lens said fourth tube securely bonding to said single fiber pigtail and to said third holding tube with a sixth epoxy for maintaining said second optimal distance; and said first holding tube holding said first GRIN lens in physical contact and securely bonding to said third holding tube holding said second GRIN lens with a seventh epoxy wherein said WDM filter is aligned with said second GRIN lens and said single and dual fiber pigtails having aligned outgoing orientation.

24. The WDM coupler of claim 23 wherein:

said first holding tube is a two-segment holding tube having a segment near said first epoxy of high viscosity having a slightly greater inside diameter than a second segment away from said high viscosity epoxy.

25. The WDM coupler of claim 23 wherein:

said second, third, fourth, fifth, sixth and seventh epoxies are a 353ND epoxy.

26. The WDM coupler of claim 23 wherein:
said first and second holding tubes are a first and a second glass tubes.

27. The WDM coupler of claim 23 wherein:
said first and second holding tubes are a first and second holding tubes having a length ranging from 3.0 to 6.5 mm with an inside diameter of about 1.8 and 2.6 mm and an outside diameter of about 3.6 mm.

28. The WDM coupler of claim 23 wherein:
said third and fourth holding tube are glass tubes.

29. The WDM coupler of claim 23 wherein:
said third holding tube is a holding tube having a length of about 4.0 to 5.5 mm and said fourth holding tube having a length ranging from 2.5 to 3.5 mm and said third and fourth holding tubes having an inside diameter of about 1.8 mm and an outside diameter of about 3.6 mm.

30. The WDM coupler of claim 23 wherein:
said first and said second GRIN lens are GRIN lenses of 0.23 pitch.

31. The WDM coupler of claim 23 wherein:
said fourth holding tube holding said single fiber pigtail is arranged slightly lower than said third holding tube for achieving an aligned outgoing orientation with said dual fiber pigtail.

32. A WDM coupler comprising:
a dual fiber collimator held in a first holding tube includes a WDM filter and a first GRIN lens bonded together by a high viscosity epoxy disposed on peripheral areas of said GRIN lens away from an optical path of said WDM coupler; and
a single fiber collimator includes a GRIN lens held in a second holding tube and a single fiber pigtail held in a third holding tube.

33. The WDM coupler of claim 32 wherein:
said dual collimator further includes a two-segment holding tube for holding said first GRIN lens having a segment near said high viscosity epoxy having a slightly greater inside diameter than a second segment away from said high viscosity epoxy.

34. The WDM coupler of claim 39 wherein:
said first holding tube and second holding tube are in contact and bonded with an epoxy and said third holding tube disposed at a slightly different vertical position from said second holding tube to achieve an aligned outgoing orientation between said single fiber pigtail and said dual fiber collimator.

35. The WDM coupler of claim 32 wherein:
said third holding tube is disposed slightly below said second holding tube.

36. The WDM coupler of claim 32 wherein:
said first, second and third holding tubes are glass holding tubes.

37. The WDM coupler of claim 32 wherein:
said high viscosity epoxy is an EP42HT heat-curing epoxy.

* * * * *